US010468659B2

United States Patent
Tyler (10) Patent No.: US 10,468,659 B2
(45) Date of Patent: Nov. 5, 2019

(54) CELL TERMINAL SEAL SYSTEM AND METHOD

(71) Applicant: Johnson Controls Technology LLC, Wilmington, DE (US)

(72) Inventor: Matthew R. Tyler, Brown Deer, WI (US)

(73) Assignee: CPS TECHNOLOGY HOLDINGS LLC, New York, NY (US)

( * ) Notice: Subject to any disclaimer, the term of this patent is extended or adjusted under 35 U.S.C. 154(b) by 358 days.

(21) Appl. No.: 15/336,664

(22) Filed: Oct. 27, 2016

(65) Prior Publication Data

US 2017/0110708 A1    Apr. 20, 2017

Related U.S. Application Data

(63) Continuation of application No. 14/019,453, filed on Sep. 5, 2013, now Pat. No. 9,502,710.

(60) Provisional application No. 61/697,539, filed on Sep. 6, 2012.

(51) Int. Cl.
  *H01M 2/04* (2006.01)
  *H01M 2/30* (2006.01)
  *H01M 2/06* (2006.01)

(52) U.S. Cl.
  CPC .............. *H01M 2/305* (2013.01); *H01M 2/06* (2013.01); *H01M 2220/20* (2013.01); *Y10T 29/49108* (2015.01)

(58) Field of Classification Search
  CPC ..... H01M 2/305; H01M 2/06; H01M 2220/20
  See application file for complete search history.

(56) References Cited

U.S. PATENT DOCUMENTS

| | | | |
|---|---|---|---|
| 4,156,756 | A | 5/1979 | Green |
| 4,544,078 | A | 10/1985 | Arenas et al. |
| 4,934,046 | A | 6/1990 | Sindorf |
| 6,060,192 | A | 5/2000 | Tucholski |
| 6,297,944 | B1 | 10/2001 | Schweikert |
| 6,335,117 | B1 | 1/2002 | Yoshida et al. |
| 6,455,193 | B1 | 9/2002 | Miyazaki et al. |
| 6,610,443 | B2 | 8/2003 | Paulot et al. |
| 7,341,802 | B1 | 3/2008 | Ota et al. |
| 8,119,280 | B2 | 2/2012 | Gardner et al. |
| 8,828,600 | B2 | 9/2014 | Kado et al. |
| 8,945,763 | B2 | 2/2015 | Tyler et al. |
| 2003/0059678 | A1 | 3/2003 | Nam et al. |

(Continued)

FOREIGN PATENT DOCUMENTS

JP       S5466122       5/1979

OTHER PUBLICATIONS

EP Application No. 13 765 576.7 Article 94(3) Communication dated Dec. 4, 2017.

(Continued)

*Primary Examiner* — Jane J Rhee
(74) *Attorney, Agent, or Firm* — Fletcher Yoder, P.C.

(57) ABSTRACT

A battery module includes a hermetically sealed battery cell assembly. The battery cell assembly includes a housing and an electrochemical cell disposed in the housing. The battery cell assembly also includes a first battery terminal coupled to and extending away from the electrochemical cell and extending through a first opening in the housing. The first opening in the housing comprises a flange. The battery cell assembly further includes a sealing ring disposed around the flange to exert a compressive force for hermetically sealing the opening.

22 Claims, 10 Drawing Sheets

(56) References Cited

U.S. PATENT DOCUMENTS

2005/0287434 A1    12/2005   Kim et al.
2010/0003584 A1    1/2010   Dougherty et al.
2013/0029215 A1    1/2013   Signorelli et al.

OTHER PUBLICATIONS

Lithium Battery Seals, Accessed Sep. 4, 2013, Hermetic Seal Technology, Inc.
International Search Report and Written Opinion for PCT Application No. PCT/US2013/058503 dated Jan. 2, 2014.

CELL TERMINAL SEAL SYSTEM AND METHOD

CROSS REFERENCE TO RELATED APPLICATIONS

This application is a continuation of U.S. patent application Ser. No. 14/019,453, filed Sep. 5, 2013, entitled "CELL TERMINAL SEAL SYSTEM AND METHOD," which claims priority from and the benefit of U.S. Provisional Application Ser. No. 61/697,539, entitled "Radial Cell Terminal Seal—Shrink/Press Fit Ring Design", filed Sep. 6, 2012, each of which is hereby incorporated by reference.

BACKGROUND

The invention relates generally to the field of batteries, battery modules, and battery systems. More specifically, the present disclosure relates to sealing systems and techniques for battery cells that may be used particularly in vehicular contexts, as well as other energy storage/expending applications.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. As will be appreciated by those skilled in the art, hybrid electric vehicles (HEVs) combine an internal combustion engine propulsion system and a battery-powered electric propulsion system, such as 48 volt or 130 volt systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of electric vehicles that include all-electric or battery electric vehicles (BEVs), plug-in hybrid electric vehicles (PHEVs), and electric vehicle conversions of hybrid electric vehicles and conventional internal combustion engine vehicles.

Vehicles using electric power for all or a portion of their motive power may provide numerous advantages as compared to traditional vehicles powered by internal combustion engines. For example, vehicles using electric power may produce fewer pollutants and may exhibit greater fuel efficiency. In some cases, vehicles using electric power may eliminate the use of gasoline entirely and derive the entirety of their motive force from electric power. As technology continues to evolve, there is a need to provide improved power sources, particularly battery modules, for such vehicles. For example, it is desirable to minimize the complexity of battery modules to decrease the costs associated with manufacturing. It is also desirable to minimize the weight and size of the battery modules to keep the vehicle lightweight and to provide space for additional vehicle components and/or storage.

Vehicles using electric power for at least a portion of their motive force may derive their electric power from multiple individual prismatic battery cells packaged into battery modules. Such battery cells generally include an electrochemical cell that is held within a housing, and positive and negative battery terminals extending through the housing to carry electrical energy from the battery cell to an outside load. Many existing battery cells use a liquid electrolyte to facilitate the internal ion flow between electrodes within the battery cell. Contamination or escape of the electrolyte from the battery cell can cause deteriorated battery performance. For this reason, among others, it is desirable to seal individual battery cells in a way that protects the components of the battery cell while facilitating access to the positive and negative battery terminals for connection to the desired load.

SUMMARY

Certain disclosed herein are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

Present embodiments of the disclosure are related to a radial cell terminal seal for use in a battery cell. The battery cell includes a housing, or battery cell can, and an electrochemical cell disposed within the housing. The housing includes openings through which battery terminals protrude from the electrochemical cell within the housing. Each opening in the housing may include an externally disposed flange that extends from the housing. A battery terminal extends through each flange. The opening through which the battery terminal extends is hermetically sealed by way of a sealing ring disposed around the flange on the housing. The sealing ring may apply a compressive force radially inward on the flange. The sealing ring may by thermally shrink fit or press fit around the flange to apply the compressive force.

Embodiments of the present disclosure are also directed to a method of manufacture of the battery cell with a radial cell terminal seal. More specifically, the sealing ring may be fit around the flange before the battery terminal is extended through the opening in the housing. The electrochemical cell may be installed into the housing, and each battery terminal pulled through a corresponding opening in the housing to hermetically seal the opening. The hermetic seal may be generated as an outer surface of the battery terminal is brought into contact with an inner surface of the flange. In some embodiments, the hermetic seal may be established through contact between the inner surface of the flange and an insulating gasket disposed around the battery terminal. The sealing ring exerts a compressive force inward on the flange to maintain the hermetic seal.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

The battery system described herein may be used to provide power to various types of electric vehicles and other high voltage energy storage/expending applications (e.g., electrical grid power storage systems). Such battery systems may include one or more battery modules, each battery module having a number of battery cells (e.g., lithium ion electrochemical cells) arranged to provide particular voltages and/or currents useful to power, for example, one or more components of an xEV. Each individual battery cell may have a housing to protect an electrochemical cell disposed within the housing. The electrochemical cell may have terminals configured to extend through openings in a top portion of the housing such that the terminals are accessible for connection to an intended load. The openings in the housing may be hermetically sealed to protect internal components of the battery cell and prevent escape of liquid electrolyte contained within the housing.

A number of different sealing assemblies may be used for hermetically sealing the openings in the top of the housing depending on the desired battery cell. For example, in an electrically positive housing assembly, the positive terminal may be hermetically sealed in direct contact with the housing itself, while the negative terminal may be hermetically sealed and insulated from the housing via an insulating gasket. In other embodiments, the battery cell may have an electrically negative housing assembly. To that end, the negative terminal may be hermetically sealed in direct contact with the housing itself, while the positive terminal may be hermetically sealed and insulated from the housing via the insulating gasket. Furthermore, a number of different assemblies may be used to provide an electrically neutral housing assembly. For example, both positive and negative terminals may be hermetically sealed in direct contact with a plastic, non conductive housing. In other embodiments, both positive and negative terminals may be hermetically sealed and insulated from a metal, conductive housing via the insulating gaskets.

Each of the aforementioned embodiments utilizes a sealing assembly which may include sealing rings disposed around flanges on the housing to provide an inward, compressive force. The terminals of the electrochemical cell may be pulled through the openings in the housing in such a way that the inward, compressive force exerted by the sealing rings hermetically seals the openings in the top of the housing.

Figure 1:
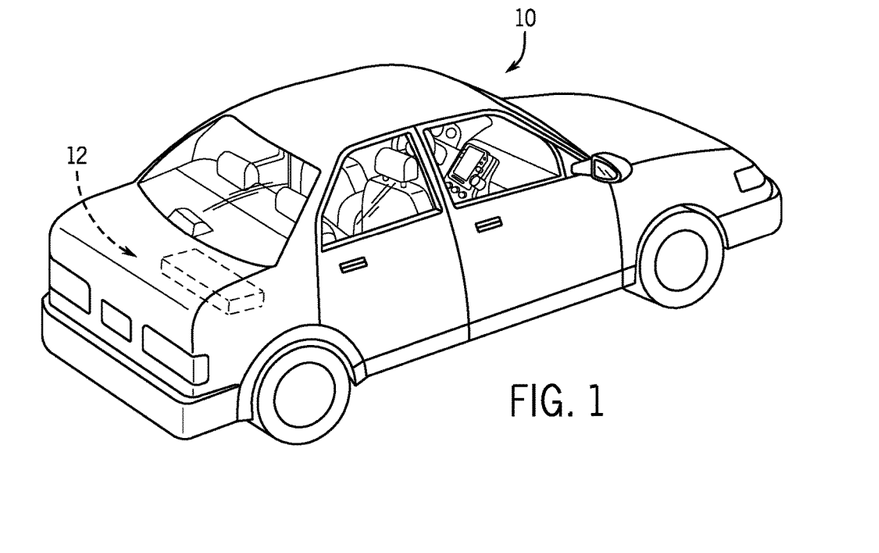
FIG. 1 is a perspective view of an embodiment of a vehicle having a battery module to provide power for various components of the vehicle.

With the foregoing in mind, FIG. 1 is a perspective view of an xEV 10 in the form of an automobile (e.g., a car) having a battery system 12 in accordance with present embodiments for providing a portion of the motive power for the vehicle 10, as described above. Although the xEV 10 may be any of the types of xEVs described above, by specific example, the xEV 10 may be a mHEV, including an internal combustion engine equipped with a microhybrid system which includes a start-stop system that may utilize the battery system 12 to power at least one or more accessories (e.g., AC, lights, consoles, etc.), as well as the ignition of the internal combustion engine, during start-stop cycles.

Further, although the xEV 10 is illustrated as a car in FIG. 1, the type of vehicle may differ in other embodiments, all of which are intended to fall within the scope of the present disclosure. For example, the xEV 10 may be representative of a vehicle including a truck, bus, industrial vehicle, motorcycle, recreational vehicle, boat, or any other type of vehicle that may benefit from the use of electric power. Additionally, while the battery system 12 is illustrated in FIG. 1 as being positioned in the trunk or rear of the vehicle, according to other embodiments, the location of the battery system 12 may differ. For example, the position of the battery system 12 may be selected based on the available space within a vehicle, the desired weight balance of the vehicle, the location of other components used with the battery system 12 (e.g., battery control units, measurement electronics, etc.), and a variety of other considerations.

Figure 2:
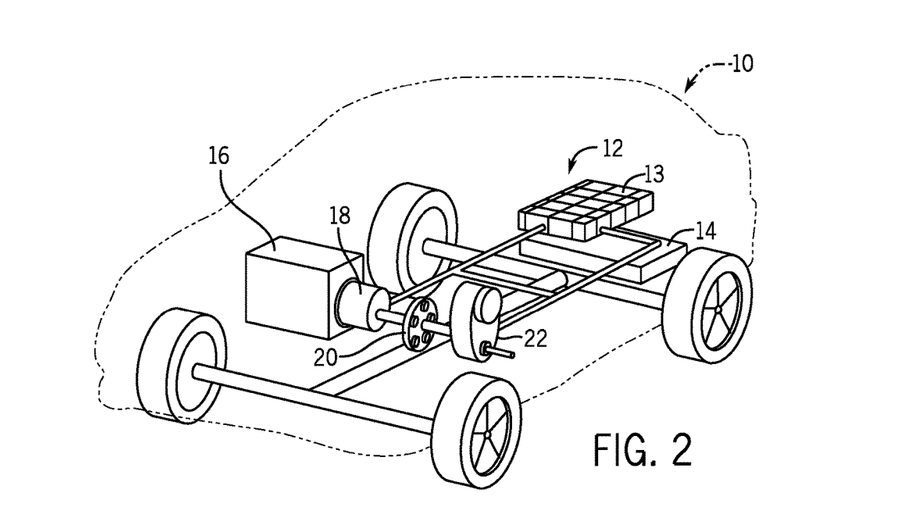
FIG. 2 is a cutaway schematic view of an embodiment of the vehicle and the battery module of FIG. 1.

An xEV 10 may be an HEV having the battery system 12, which includes one or more battery modules 13, as illustrated in FIG. 2. In particular, the battery system 12 illustrated in FIG. 2 is disposed toward the rear of the vehicle 10 proximate a fuel tank 14. In other embodiments, the battery system 12 may be provided immediately adjacent the fuel tank 14, provided in a separate compartment in the rear of the vehicle 10 (e.g., a trunk), or provided in another suitable location in the HEV 10. Further, as illustrated in FIG. 2, the HEV 10 includes an internal combustion engine 16 for times when the HEV 10 utilizes gasoline power to propel the vehicle 10. The HEV 10 also includes an electric motor 18, a power split device 20, and a generator 22 as part of the drive system.

The HEV 10 illustrated in FIG. 2 may be powered or driven by the battery system 12 alone, by the combustion engine 16 alone, or by both the battery system 12 and the combustion engine 16. It should be noted that, in other embodiments of the present approach, other types of vehicles and configurations for the vehicle drive system may be utilized, and that the schematic illustration of FIG. 2 should not be considered to limit the scope of the subject matter described in the present application. According to various embodiments, the size, shape, and location of the battery system 12 and the type of vehicle, among other features, may differ from those shown or described.

Figure 3:
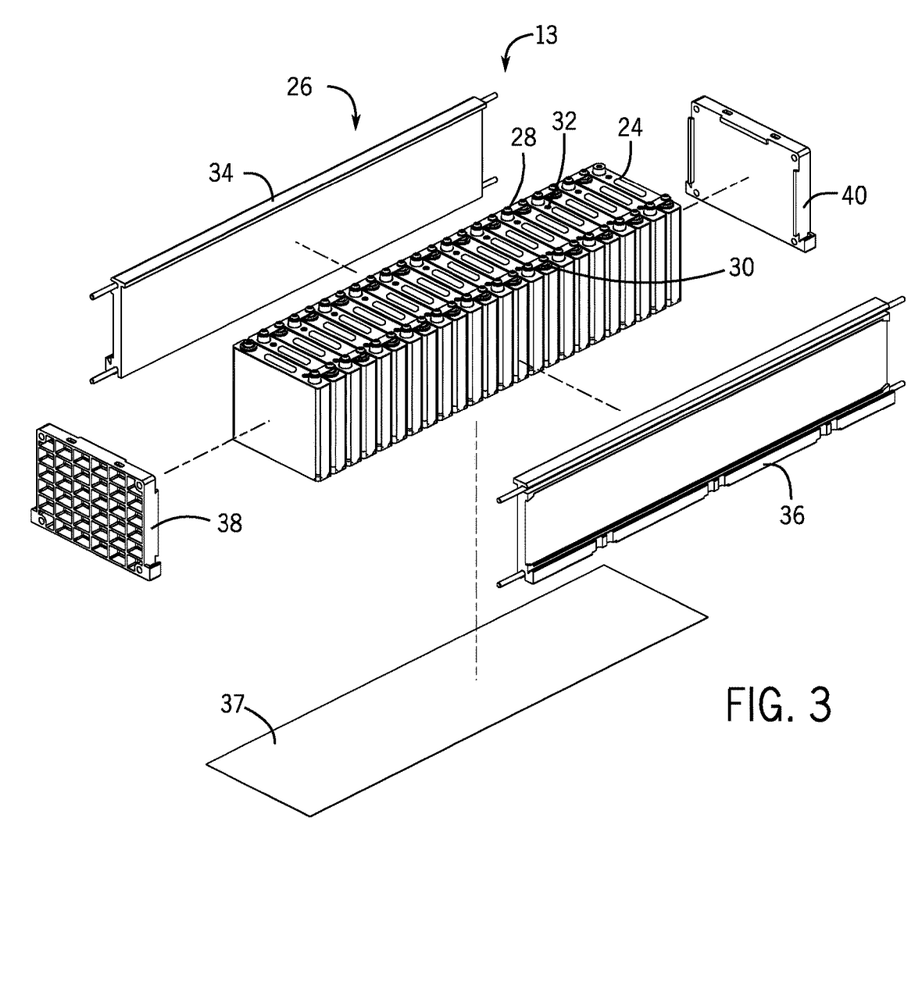
FIG. 3 is a partial exploded perspective view of a battery module for use in the vehicle of FIG. 1.

One embodiment of a suitable battery module 13 is illustrated in an exploded perspective view in FIG. 3. As shown, the battery module 13 includes a plurality of battery cells 24 that are contained within a battery module shell 26. The battery cells 24 may be, for example, lithium-ion cells, nickel-metal-hydride cells, lithium polymer cells, or other types of battery cells now known or hereafter developed. According to an embodiment, the cells include at least one terminal, such as a positive terminal 28 and/or a negative terminal 30, and a relief device, such as a vent 32.

The battery cells 24 in the illustrated embodiment are provided side-by-side (face-to-face) one another such that a face of a first electrochemical cell is adjacent a face of a second electrochemical cell (e.g., the cells face one another). According to the illustrated embodiment, the cells 24 are stacked in an alternating fashion such that the positive terminal 28 of the first cell is provided adjacent the negative terminal 30 of the second cell. Likewise, the negative terminal 30 of a first cell 24 is provided adjacent a positive terminal 28 of a second cell 24. Such an arrangement allows for efficient connection of the battery cells 24 in series via bus bars. However, the battery cells 24 may be otherwise arranged and/or connected (e.g., in parallel, or in a combination of series and parallel) in other embodiments.

In the illustrated embodiment, the battery module shell 26 for the battery module 13 includes a first side bracket 34, a second side bracket 36, and a bottom lid 37. The shell 26 further includes a first end cap 38 and a second end cap 40. As shown, the end caps 38 and 40 are secured to the side brackets 34 and 36, respectively, and the bottom lid 41 is fixed to the bottom of the assembly.

According to one embodiment, the battery cells 24 may be generally prismatic lithium-ion cells configured to store an electrical charge. According to other embodiments, the battery cells 24 may have other physical configurations (e.g., oval, cylindrical, polygonal, etc.). Additionally, in some embodiments, the capacity, size, design, and other features of the battery cells 24 may differ from those shown.

Figures 4, 4A:
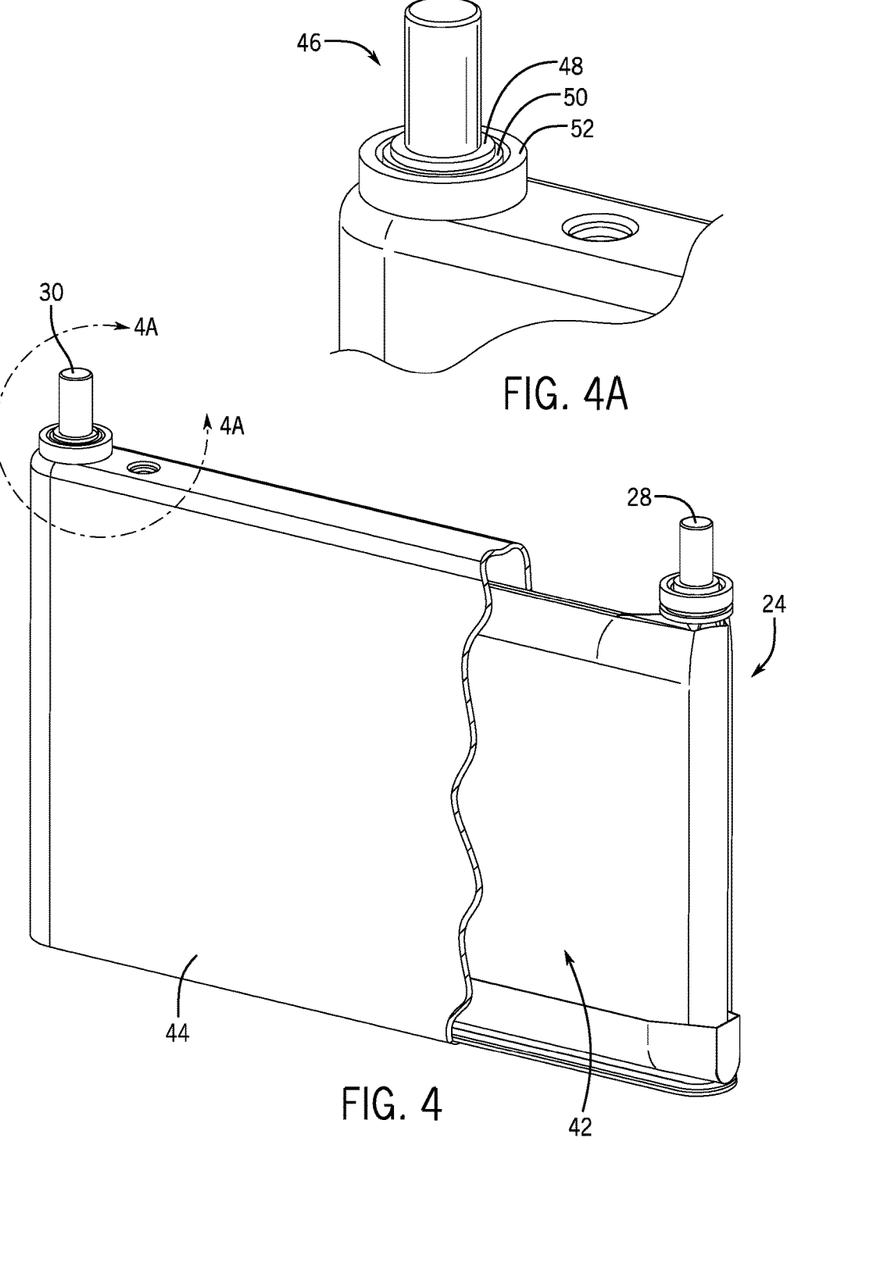
FIG. 4 is a perspective view of an embodiment of a battery cell for use in the battery module of FIG. 3, the battery cell having a sealing assembly for sealing an opening in the battery cell.
FIG. 4A is a detailed perspective view of an embodiment of the sealing assembly of FIG. 4.

One such embodiment of the aforementioned battery cell 24 contained within the battery module 13 of FIG. 3 is illustrated in FIG. 4. In the illustrated embodiment, the battery cell 24 includes an electrochemical cell 42 disposed within a housing 44, or battery cell can. The electrochemical cell 42 may have two battery terminals, the positive terminal 28 and the negative terminal 30, for transmitting energy to an intended load. An expanded view of the negative terminal 30 extending from the electrochemical cell 42 and through the housing 44 is shown. In the presently illustrated embodiment, a sealing assembly 46 is used to seal the battery cell 24. The sealing assembly 46 may include an insulating gasket 48 (depending on an intended electrical charge of the housing 4), a flange 50 disposed on an upper portion, or the top 51 of the housing 44, and a sealing ring 52, which exerts a compressive force on the flange 50.

Figure 5:
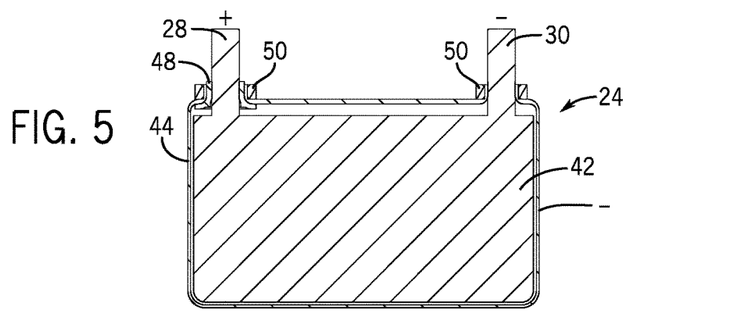
FIG. 5 is a cross sectional view of an embodiment of a battery cell for use in the battery module of FIG. 3.
Figure 6:
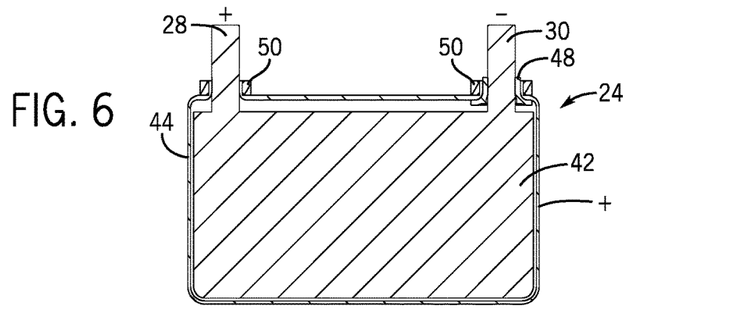
FIG. 6 is a cross sectional view of another embodiment of a battery cell for use in the battery module of FIG. 3.
Figure 7:
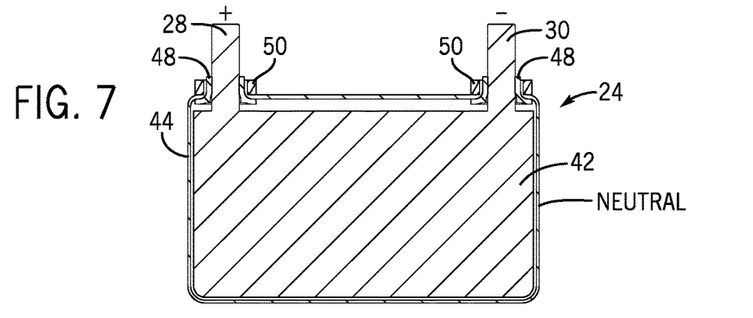
FIG. 7 is a cross sectional view of another embodiment of a battery cell for use in the battery module of FIG. 3.
Figure 8:
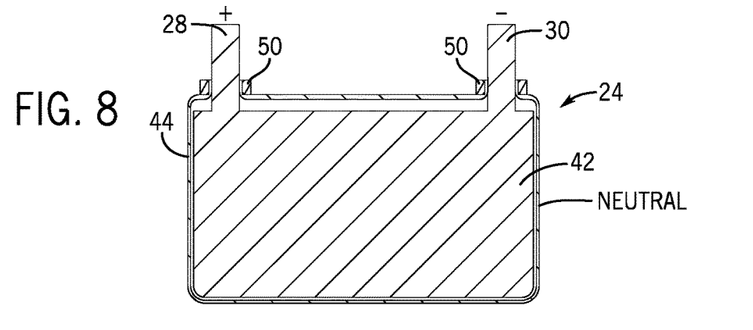
FIG. 8 is a cross sectional view of another embodiment of a battery cell for use in the battery module of FIG. 3.

As noted above, the battery cell 24 may or may not include insulating gaskets 48 depending on the electrical charge desired for the housing. For example, FIGS. 5-8 show a number of embodiments of sealing assemblies 46 tailored to the intended electrical orientation of the housing 44. In FIG. 5, the positive terminal 28 is insulated from the housing 44 via an insulating gasket 48, while the negative terminal 30 is in direct contact with the housing 44, resulting in a negatively charged housing 44. In FIG. 6, the negative terminal 30 is insulated from the housing 44 via an insulating gasket 48, while the positive terminal 28 is in direct contact with the housing 44, resulting in a positively charged housing 44. In FIG. 7, both the positive terminal 28 and the negative terminal 30 are insulated from a metal, conductive housing 44 via insulating gaskets 48 such that the housing 44 remains neutral. In FIG. 8, the housing 44 is made of a plastic material, and thus remains neutral even with both the positive terminal 28 and the negative terminal 30 in direct contact with the housing 44.

Figure 9:
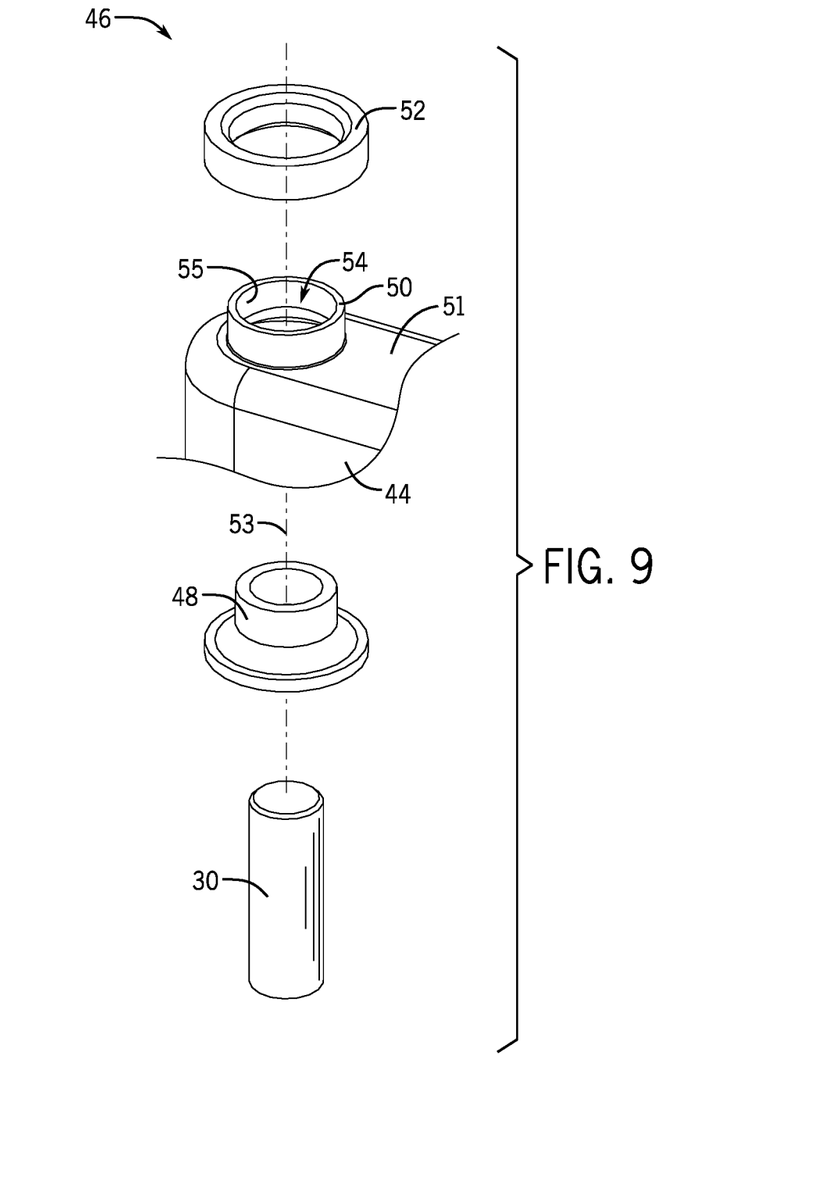
FIG. 9 is an exploded perspective view of an embodiment of the sealing assembly for sealing the opening in the battery cell of FIG. 4.
Figure 10:
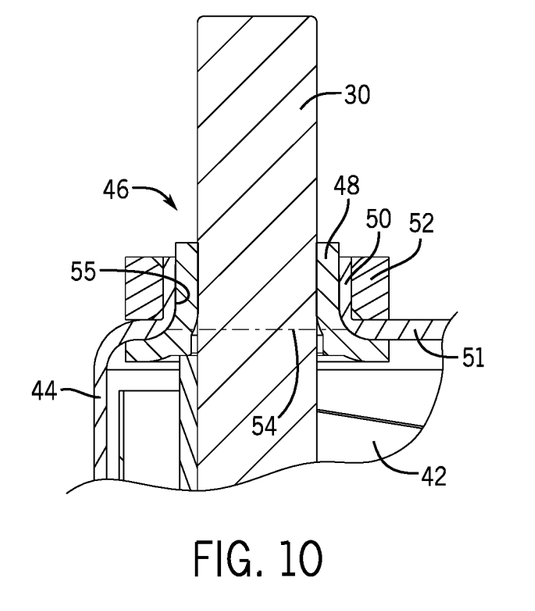
FIG. 10 is a cross sectional view of an embodiment of the sealing assembly for sealing the opening in the battery cell of FIG. 4.

One particular embodiment of the aforementioned sealing assembly 46 is illustrated in FIGS. 9 and 10, wherein the illustrated terminal is intended to be electrically insulated from the housing 44. In these figures, the assembly is centered along an axis 53 that is oriented substantially perpendicular to an upper surface of the housing 44. An opening 54 exists in the top 51 of the housing 44 to allow the battery terminal (e.g., negative terminal 30) to extend from the electrochemical cell 42 through the housing 44 along the axis 53, such that the insulating gasket 48 disposed around the negative terminal 30 makes contact with the housing 44 and insulates the negative terminal 30 from the housing 44. As noted above, the illustrated sealing assembly 46 may apply to a positive terminal 28 in certain other embodiments wherein the positive terminal 28 is intended to be insulated from the housing 44. The opening 54 in the sealing assembly 46 is hermetically sealed via the sealing ring 52, which exerts a compressive force on the flange 50 for hermetically sealing the opening 54 in the top 51 of the housing 44.

Figure 11:
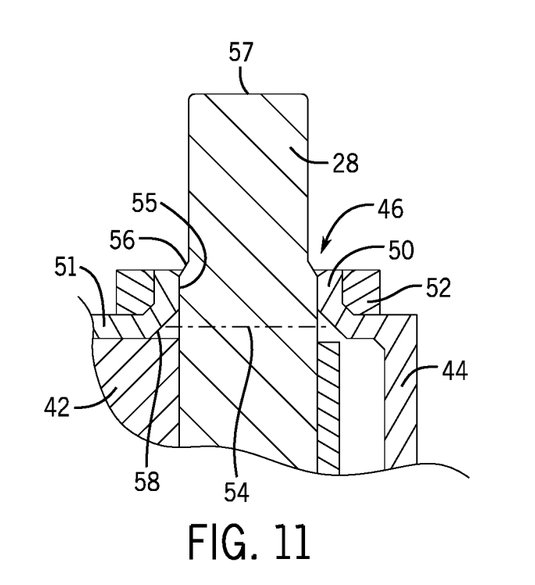
FIG. 11 is a cross sectional view of another embodiment of the sealing assembly for sealing the opening in the battery cell of FIG. 4.

In other embodiments, as described above, it may be desirable for the battery terminal to directly contact an inner surface 55 of the flange 50 disposed on the housing 44. The absence of the insulating gasket 48 may occur for any number of reasons, as discussed above and illustrated in FIGS. 5, 6 and 8. The sealing assembly 46 illustrated in FIG. 11 shows an embodiment of the terminal which is intended to directly contact the housing 44. In this embodiment, the battery terminal (e.g. the positive terminal 28) extends from the electrochemical cell 42 through the opening 54 in the top 51 of the housing 44. As noted above, the illustrated sealing assembly 46 may apply to a negative terminal 30 in certain other embodiments wherein the negative terminal 30 is intended to make direct contact with the housing 44. In the illustration, the sealing ring 52 exerts a compressive force on the flange 50 for hermetically sealing the opening 54 in the top 51 of the housing 44 via direct contact of the positive terminal 28 with an inner surface 55 of the housing 44.

To permit an efficient production of the battery cell 24 that has at least one terminal making direct contact with the inner surface 55 of the flange 50 (e.g. a charged housing 44 assembly or a neutral, plastic housing 44 assembly as discussed above), the battery terminal may include a tapered surface 56, as is illustrated in FIG. 11. This may allow a decreased cross sectional area 57 of the terminal, in this case the positive terminal 28, to extend through the housing 44 to an intended distance outside of the housing 44 before making contact with the inner surface 55 of the flange 50 disposed around the opening 54 in the housing 44. Furthermore, the opening 54 in the top 51 of the housing 44 may include a radius edge or chamfered edge 58 to permit acceptance of the positive terminal 28 or negative terminal 30 and direct the terminal through the opening 54. It should also be noted that the tapered surface 56 of the positive terminal 28 or negative terminal 30 and the chamfered edge 58 of the opening 54 in the top 51 of the housing 44 may be included in other embodiments of the sealing assembly 46 and the battery cell 24 in general, such as those including one or more insulating gaskets 48.

Figure 12:
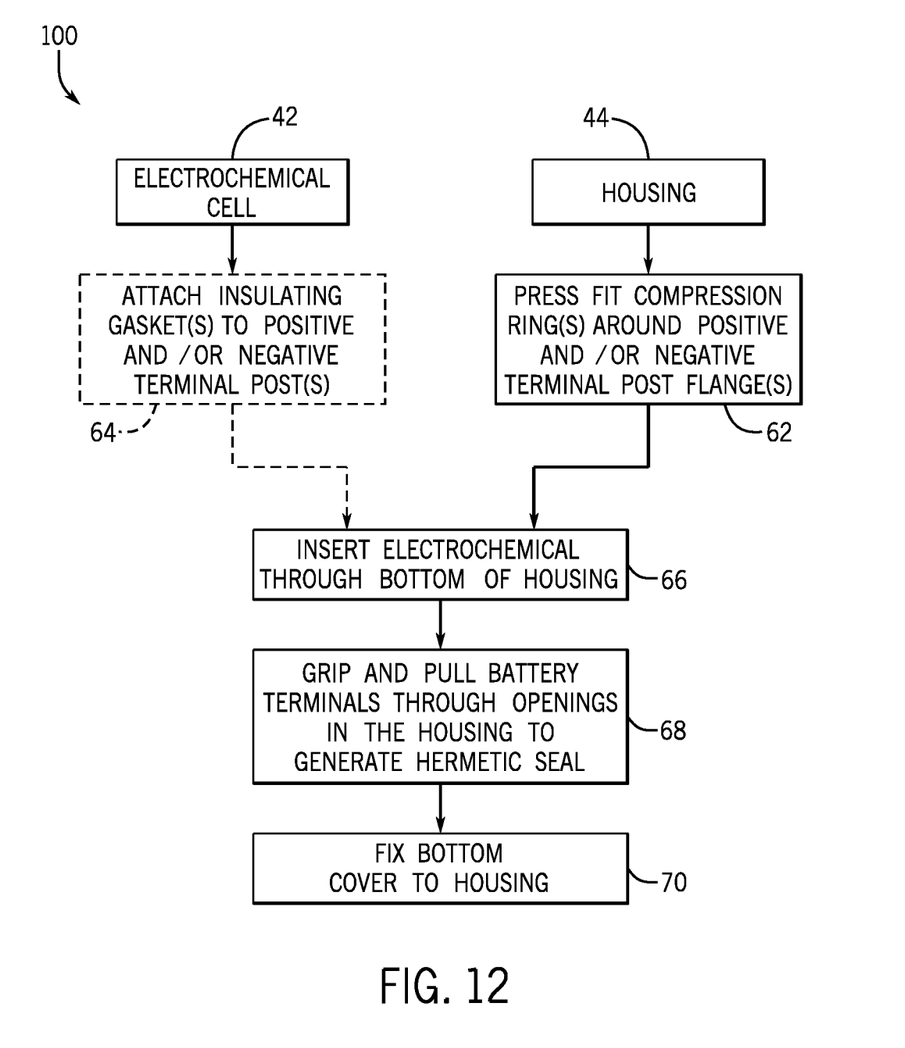
FIG. 12 is a process flow diagram of an embodiment of a method of manufacture of the battery cell of FIG. 4.
Figure 13:
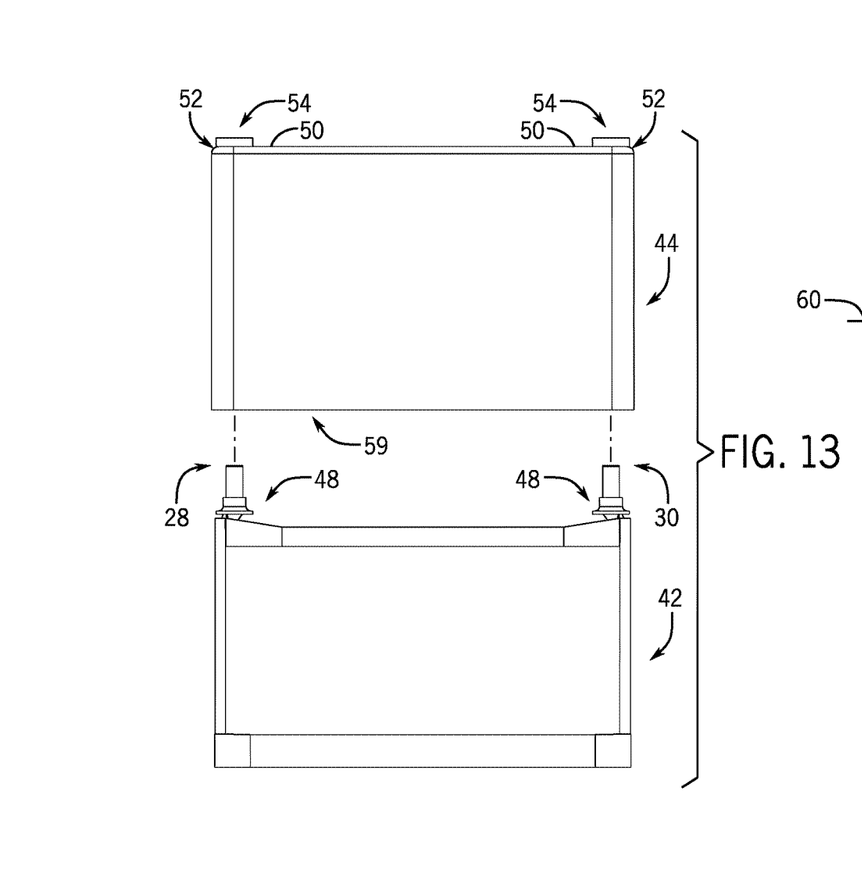
FIG. 13 is a front view of an embodiment of an electrochemical cell being installed into a housing to generate a sealed battery cell.
Figure 14:
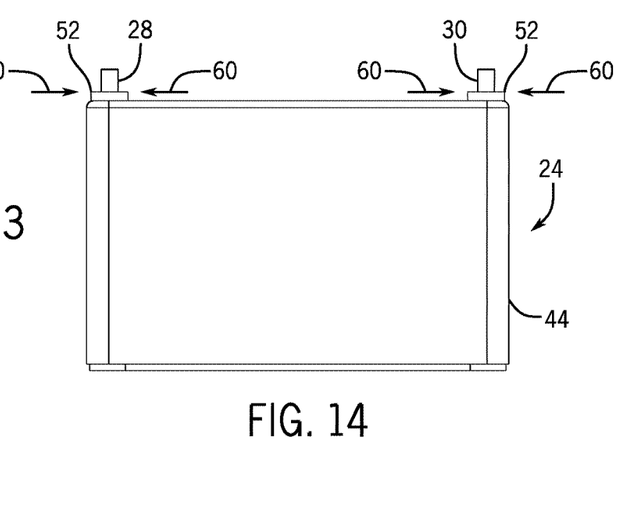
FIG. 14 is a front view of an embodiment of the electrochemical cell installed into the housing of FIG. 8.

Along with the various embodiments of the battery cell 24 having the sealing assembly 46, various techniques may be used for producing the battery cell 24 by way of installing the electrochemical cell 42 into the housing 44. One such technique is illustrated in a method 60 shown in FIG. 12, with an embodiment illustrating the physical assembly in FIGS. 13 and 14. The method 60 involves installing the electrochemical cell 42 into the housing 44 and generating a hermetic seal for the battery cell 24 assembly. Assembly of the housing may involve fitting the compression rings 52 around the flanges 50 disposed on the top 51 of the housing 44 (or battery can) and around openings 54, as shown in block 62. The openings 54 are configured to receive the battery terminals 28, 30 of the electrochemical cell 42. Assembling the electrochemical cell 42 may involve attaching insulating gasket(s) 48 to one or both of the battery terminals 28, 30 extending from the electrochemical cell 42 as shown in block 64. In the case of the electrically neutral housing 44, no insulating gaskets 48 may be used as both battery terminals 28, 30 are intended to make direct contact with the housing 44. In the present method 60, the electrochemical cell 42 is inserted through a bottom portion 65 of the housing 44 until the battery terminals 28, 30 are accessible by a tool used to grip the battery terminals 28,30, as represented in block 66. The battery terminals 28, 30 are pulled through the openings 54 in the housing 44 to generate a hermetic seal, as shown in block 68. In other words, the hermetic seal is generated by pulling the battery terminals 28, 30 through the openings 54 in the housing 44 until the insulating gaskets 46, an outer diameter of the battery terminals 28, 30, or one of each, makes contact with the inner surface 55 of the flanges 50 disposed around the openings 54 in the housing 44. The compression rings 52 exert a compressive force radially inward, indicated by arrows 67 to generate the hermetic seal. A bottom cover 69 may then be fixed (e.g., welded) to the bottom portion 65 of the housing 44 to fully enclose the electrochemical cell 42 within the housing 44, as represented by block 70.

Figure 15:
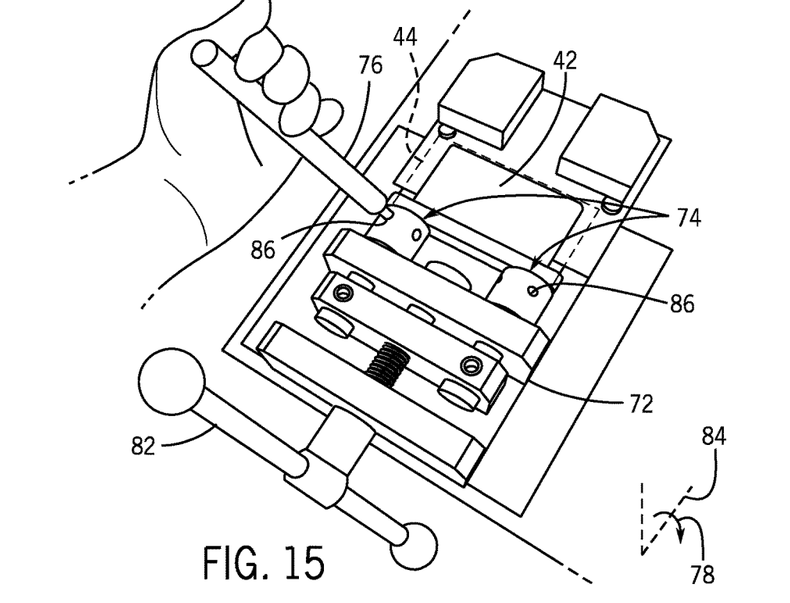
FIG. 15 is a perspective view of an embodiment of a mechanism used to install an electrochemical cell into a housing to generate a sealed battery cell by grasping the battery cell terminals.
Figure 16:
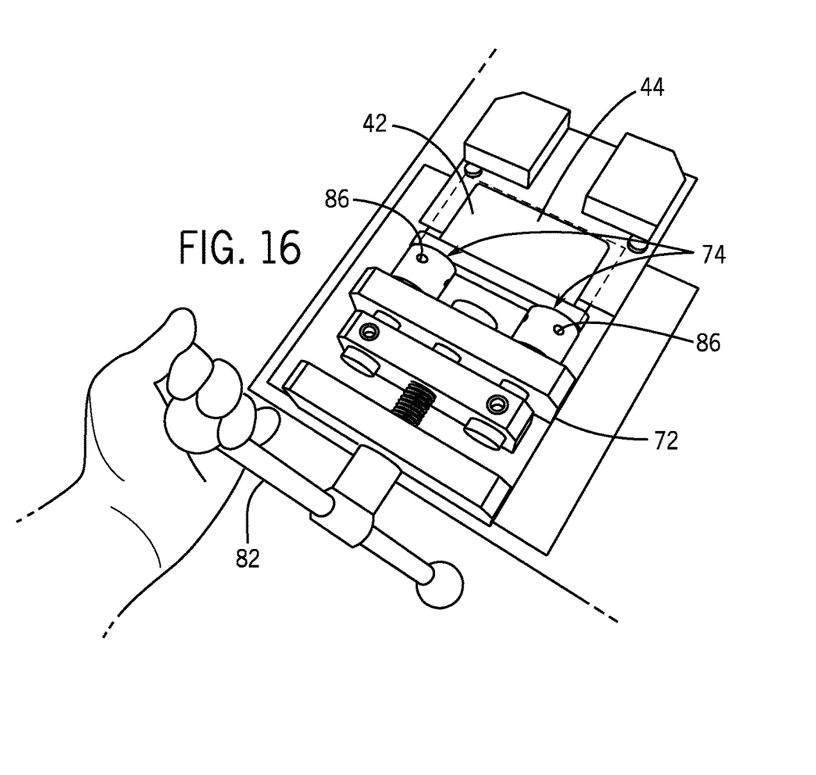
FIG. 16 is a perspective view of the mechanism of FIG. 15 being used to install the electrochemical cell into the housing by pulling the terminals through the battery cell housing.
Figure 17:
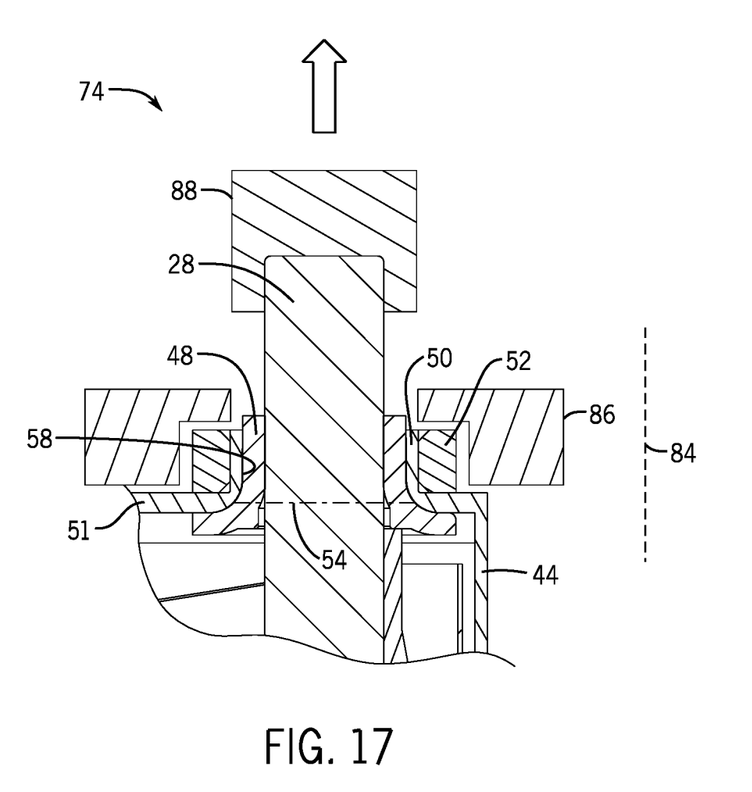
FIG. 17 is a cross sectional view of an embodiment of the battery terminal being pulled through the opening of FIG. 4.

Certain tools may be used to facilitate the above described installation technique. One such sealing tool 72 is illustrated in FIGS. 15 and 16, which show an embodiment of the battery cell 24 during installation of the electrochemical cell 42 into the housing 44. A cross sectional illustration of the sealing tool 72 in conjunction with a portion of the battery cell 24 (i.e. one of the two battery terminals, for example the positive terminal 28, and its respective sealing assembly 46) is shown in FIG. 17. In this embodiment, the electrochemical cell 42 is aligned with the housing 44 such that the battery terminals 28, 30 are aligned with the openings 54 in the housing 44 and are directly accessible by the sealing tool 72. In one embodiment, the battery terminals 28, 30 may be aligned such that they partially extend through the openings 54 in the top 51 of the housing 44. The sealing tool 72 grips an outer diameter of the battery terminals 28, 30 with clamps 74. The clamps 74 are tightened around the battery terminals 28, 30 via turning of a first handle 76. The first handle 76 in the illustrated embodiment is turned in a clockwise direction 78 to tighten the clamps 74 around the battery terminals 28, 30, although in other embodiments it may be turned in a counterclockwise direction to perform the same function. In other embodiments, the terminal grips may be tightened via a linear clamping mechanism to perform the same function. When enough torque is applied on the first handle 76 to sufficiently grip the battery terminals 28, 30 with the clamps 74, the first handle 76 is removed from the clamps 74, locking the clamps 74 in a gripping engagement around the battery terminals 28, 30.

The battery terminals 28, 30 are pulled through the openings 54 in the housing 44 by turning a second handle 82. In this embodiment, the second handle 82 is turned in the clockwise direction 78 to pull the battery terminals 28, 30 through the openings 54 in the housing 44, but in other embodiments the second handle 82 may be turned in the counterclockwise direction to perform the same function. In other embodiments, the terminal pull operation may function via a linear actuating mechanism. The turning of the second handle 82 pulls the battery terminals 28, 30 and the accompanying electrochemical cell 42 toward the second handle 82. Specifically, the sealing tool 72 pulls the battery terminals 28, 30 in a direction parallel to an axis 84, this axis 84 being aligned with an axis of one of the battery terminal posts. The clamps 74 may each include a bracing portion 86 and a gripping portion 88, as shown in FIG. 17. The bracing portion has a surface in a plane perpendicular to the first axis 84. The clamp 74 may leverage the housing 44 and sealing ring 52 against this surface of the bracing portion 86. This may maintain the housing 44 and sealing ring 52 in a relatively stationary position while the electrochemical cell 42 and the battery terminals 28, 30 are pulled in the direction parallel to the first axis 84. The battery terminals 28, 30 are pulled through the openings 54 in the housing 44 until the outer diameter of the battery terminals 28, 30, or the insulating gaskets 48 disposed around the battery terminals 28, 30, contact the inner surface 55 of the flanges 50 disposed around the openings 54 in the housing 44. This generates the hermetic seal as the sealing ring 52 exerts the compressive force radially against the flange 50 and thus the insulating gasket 48 and the terminal 30. It should be noted that other assembly methods are possible for the battery cell 24. For example, the sealing assembly 46 may be engaged by pressing the sealing ring 52 over the flange 50 after the battery terminals 28,30 have already been inserted through the openings 54 in the top 51 of the housing 44.

While only certain features and embodiments of the invention have been illustrated and described, many modifications and changes may occur to those skilled in the art (e.g., variations in sizes, dimensions, structures, shapes and proportions of the various elements, values of parameters, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A battery module having a battery cell assembly, the battery cell assembly comprising:
   a housing having an electrically conductive material, wherein the housing comprises a wall, a first flanged opening defined by a first flange of the wall, a second flanged opening defined by a second flange of the wall, an opening opposite to the wall, and a volume defined by the housing between the wall and the opening opposite to the wall, wherein the volume is sufficient to receive a body of an electrochemical cell, and wherein the opening is configured to be sealed by a cover;
   the electrochemical cell disposed in the volume of the housing, the electrochemical cell having a positive terminal and a negative terminal, the positive terminal extending through the first flanged opening, and the negative terminal extending through the second flanged opening;
   a first insulating gasket positioned within the first flanged opening between the positive terminal and the first flange of the wall so as to electrically insulate the positive terminal from the first flange, and a second insulating gasket positioned within the second flanged opening between the negative terminal and the second flange of the wall so as to electrically insulate the negative terminal from the second flange; and
   a first sealing ring disposed around the first flange such that the first sealing ring exerts a compressive force against the first flange to hermetically seal the first flanged opening, and a second sealing ring disposed around the second flange such that the second sealing ring exerts a compressive force against the second flange to hermetically seal the second flanged opening.

2. The battery module of claim 1, wherein the first and second sealing rings are press fit around the first and second flanges, respectively.

3. The battery module of claim 1, wherein the first and second sealing rings are thermally shrink fit around the first and second flanges, respectively.

4. The battery module of claim 1, wherein the first and second sealing rings comprise a metallic material.

5. The battery module of claim 1, wherein the first flange comprises a first inner surface defining the first flanged opening through the housing, wherein the first inner surface comprises a first chamfered inner edge configured to enable reception of the first insulating gasket, wherein the second flange comprises a second inner surface defining the second flanged opening through the housing, and wherein the second inner surface comprises a second chamfered inner edge configured to enable reception of the second insulating gasket.

6. The battery module of claim 1, wherein the housing comprises a metallic material.

7. A battery cell assembly, comprising:
   a housing comprising an electrically conductive material, configured to be sealed by a cover, and configured to receive an electrochemical cell having a positive terminal and a negative terminal;
   a first flange defining a first flanged opening through the housing, and a second flange defining a second flanged opening through the housing, wherein the first flanged opening is configured to receive the positive terminal, and wherein the second flanged opening is configure to receive the negative terminal;
   a first sealing ring disposed around the first flange, and a second sealing ring disposed around the second flange, wherein the first sealing ring exerts a compressive force on the first flange, and the second sealing ring exerts a compressive force on the second flange; and
   a first gasket disposed within the first flanged opening and radially between the first flange and the positive terminal, and a second gasket disposed within the second flanged opening and radially between the second flange and the negative terminal.

8. The battery cell assembly of claim 7, wherein the first sealing ring and the second sealing ring are press fit around the first flange and the second flange, respectively.

9. The battery cell assembly of claim 7, wherein the first sealing ring and the second sealing ring are thermally shrink fit around the first flange and the second flange, respectively.

10. The battery cell assembly of claim 7, wherein the first flange comprises a first inner surface defining the first flanged opening through the housing, wherein the first inner surface comprises a first chamfered inner edge configured to enable reception of the first gasket, wherein the second flange comprises a second inner surface defining the second flanged opening through the housing, and wherein the second inner surface comprises a second chamfered inner edge configured to enable reception of the second gasket.

11. The battery cell assembly of claim 7, wherein the first flange and the second flange extend from, and the first flanged opening and the second flanged opening extend through, a substantially closed top wall of the housing, and wherein the substantially closed top wall of the housing is integral with sidewalls of the housing.

12. The battery cell assembly of claim 11, comprising an open bottom end of the housing opposite to the substantially closed top wall of the housing, wherein the open bottom end of the housing is configured to receive the electrochemical cell therethrough, and wherein the open bottom end of the housing is configured to be closed by the cover.

13. The battery cell assembly of claim 12, wherein the housing comprises a volume defined between the substantially closed top wall, the sidewalls, and the open side, and wherein the volume is sufficient to receive an entirety of a body of the electrochemical cell such that the cover encloses the body of the electrochemical cell within the volume of the housing.

14. The battery cell assembly of claim 7, wherein the housing comprises a metallic material.

15. A method of manufacturing a battery cell, comprising:
disposing a first insulating gasket about a first terminal of an electrochemical cell element;
disposing a second insulating gasket about a second terminal of the electrochemical cell element;
moving the first terminal and the second terminal through a first flanged opening and a second flanged opening, respectively, of a housing of the battery cell, wherein the first and second flanged openings are defined by first and second flanges, respectively, of the housing;
gripping, via a gripping portion of a sealing tool, the first terminal and the second terminal;
pulling, via the gripping portion, the first terminal and the second terminal within the first flanged opening and the second flanged opening, respectively, at least until the first insulating gasket disposed around the first terminal contacts the first flange and the second insulating gasket disposed around the second terminal contacts the second flange;
fitting a first sealing ring around the first flanged opening and exerting a first compressive force, with the first sealing ring, radially inwards on the first flange;
fitting a second sealing ring around the second flanged opening and exerting a second compressive force, with the second sealing ring, radially inwards on the second flange; and
establishing a hermetic seal of the first and second flanged openings.

16. The method of claim 15, comprising moving the electrochemical cell element through an open side of the housing opposite to a substantially closed side of the housing, wherein the closed side of the housing comprises the first and second flanged openings.

17. The method of claim 16, comprising sealing a cover to a bottom edge of the housing proximate to the open side, thereby enclosing a body of the electrochemical cell element within a volume of the housing defined between the open side and the substantially closed side.

18. The method of claim 15, comprising moving the first and second terminals through the first and second flanged openings to cause the first and second insulating gaskets to contact first and second chamfered edges defining a portion of the first and second flanged openings, respectively.

19. The method of claim 15, wherein pulling, via the gripping portion, the first terminal and the second terminal within the first flanged opening and the second flanged opening, respectively, comprises pulling the first terminal and the second terminal, via the gripping portion, within the first flanged opening and the second flanged opening, respectively, while the housing, the first sealing ring, or both are braced against a bracing portion of the sealing tool.

20. The method of claim 19, wherein exerting the first compressive force comprises clamping the first sealing ring, via a clamp of the sealing tool, while the housing, the first sealing ring, or both are braced against the bracing portion of the sealing tool, to cause the first sealing ring to exert the first compressive force radially inwards on the first flange.

21. The method of claim 19, wherein exerting the first compressive force comprises allowing the first sealing ring to thermally shrink fit toward the first flange while the housing, the sealing ring, or both are braced against the bracing portion of the sealing tool, to cause the first sealing ring to exert the first compressive force radially inwards on the first flange.

22. The method of claim 15, wherein the gripping portion comprises a first gripper corresponding to the first terminal and a second gripper corresponding to the second terminal.

* * * * *

UNITED STATES PATENT AND TRADEMARK OFFICE
CERTIFICATE OF CORRECTION

| | |
|---|---|
| PATENT NO. | : 10,468,659 B2 |
| APPLICATION NO. | : 15/336664 |
| DATED | : November 5, 2019 |
| INVENTOR(S) | : Matthew R. Tyler |

It is certified that error appears in the above-identified patent and that said Letters Patent is hereby corrected as shown below:

In the Specification

In Column 1, Line 9, delete "METHOD," and insert -- METHOD, now Pat. No. 9,502,710" --, therefor.

In Column 1, Line 43, delete "full hybrid systems (FHEVs)" and insert -- full hybrid electric vehicles (FHEVs) --, therefor.

In Column 1, Line 46, delete "mild hybrid systems (MHEVs)" and insert -- mild hybrid electric vehicles (MHEVs) --, therefor.

In Column 2, Line 44, delete "Certain disclosed" and insert -- Certain embodiments disclosed --, therefor.

In Column 3, Line 14, delete "DRAWINGS" and insert -- BRIEF DESCRIPTION OF THE DRAWINGS --, therefor.

In Column 7, Line 65, delete "insulating gaskets 46," and insert -- insulating gaskets 48, --, therefor.

In the Claims

In Column 10, Line 27, in Claim 7, delete "configure" and insert -- configured --, therefor.

Signed and Sealed this
Eleventh Day of February, 2020

Andrei Iancu
*Director of the United States Patent and Trademark Office*